United States Patent [19]

Anderson et al.

[11] Patent Number: 4,755,995
[45] Date of Patent: Jul. 5, 1988

[54] PROGRAM UPDATE IN DUPLICATED SWITCHING SYSTEMS

[75] Inventors: Roy E. Anderson; Gerald A. Inberg; Dennis J. Mikalauskas, all of Naperville; Genevieve L. Nawa, Batavia, all of Ill.

[73] Assignee: American Telephone and Telegraph Company, AT&T Bell Laboratories, Murray Hill, N.J.

[21] Appl. No.: 811,827

[22] Filed: Dec. 20, 1985

[51] Int. Cl.$^4$ .................... H04M 3/24; G06F 11/16
[52] U.S. Cl. ..................................... 371/9; 371/19; 371/25; 379/279
[58] Field of Search .................... 371/8, 9, 12, 16, 19, 371/25, 62; 364/200 MS File, 900 MS File; 179/18 ES; 379/279

[56] References Cited

U.S. PATENT DOCUMENTS

| | | | |
|---|---|---|---|
| 3,775,566 | 11/1973 | Akimaru | 371/9 X |
| 3,908,099 | 9/1975 | Barbas | 371/8 |
| 3,916,178 | 10/1975 | Greenwald | 371/16 |
| 4,183,459 | 1/1980 | Donn | 371/25 X |
| 4,321,667 | 3/1982 | Robbins et al. | 364/200 |
| 4,352,103 | 9/1982 | Slater | 371/8 X |
| 4,520,440 | 5/1985 | Buonomo | 371/25 X |

FOREIGN PATENT DOCUMENTS

3334792 11/1984 Netherlands ............... 371/9

OTHER PUBLICATIONS

H. J. Beuscher et al., "Administration and Maintenance Plan", *The Bell System Technical Journal*, Oct. 1969, vol. 48, No. 8, pp. 2765–2815.

R. W. Downing et al. "No. 1 ESS Maintenance Plan", *The Bell System Technical Journal*, vol. 43, Sep. 1964, No. 5, Part 1, pp. 1961–2019.

T. E. Browne et al. "Control Unit System", *The Bell System Technical Journal*, vol. 48, Oct. 1969, No. 8, pp. 2619–2668.

Primary Examiner—Jerry Smith
Assistant Examiner—Robert W. Beausoliel, Jr.
Attorney, Agent, or Firm—Kenneth H. Samples; Peter Visserman

[57] ABSTRACT

A time-division switching system including first and second control units operating in accordance with a generic program is disclosed. After a new generic program is stored in the second control unit, the first control unit still operating in response to the old generic program initiates the performance of a test sequence by the second control unit. The first control unit times the execution of the test sequence. When the test sequence is not completed within a predetermined period of time or when test results generated by the test sequence do not match expected test results, a failure message is generated. Alternatively, when the test sequence is completed within the predetermined period of time and test results match the expected test results, a success message is generated.

15 Claims, 5 Drawing Sheets

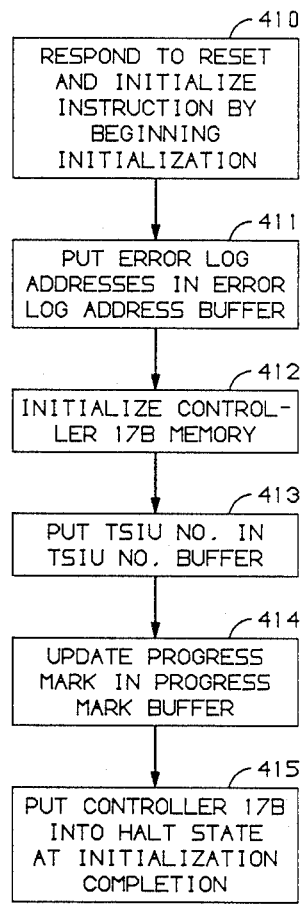

PROGRAM UPDATE IN DUPLICATED SWITCHING SYSTEMS

TECHNICAL FIELD

The present invention relates to program update in telecommunications switching equipment and, more particularly, program update in such a system having duplicated controllers.

BACKGROUND OF THE INVENTION

Modern telecommunications switching systems generally comprise a switching network and a controller which operates under the control of a program and data stored in memory. This program and its associated data are referred to herein as the generic program. A given generic program provides numerous services and features for the switching system and its subscribers. An objective in the design of telecommunications switching equipment is to provide a system which continuously provides services and features to its subscribers. A significant contribution to attaining that objective is the provision of duplicated equipment such as controllers. With duplicated controllers, one is used to control the switching network and if it fails the other can be substituted for the first to provide continuing service.

From time to time, it may be desirable to change a generic program to add or delete features or to provide existing features in an improved manner. Thus, a new generic program is written which will achieve the desired result when executed by the controllers. Typically, when the generic program is updated, the old generic program is replaced with the new generic program in the one of the duplicated controllers not controlling the switching network. Then, the roles of controllers are switched so that the controller executing the new generic program controls the network. The new generic can then be stored in the non-controlling controller which will be available as a substitute.

Since the generic program is in control of the switching network, faults in the program can substantially affect the quality of service provided to subscribers. Accordingly, new generic programs are tested as exhaustively as practical in a laboratory environment before being used in a switching office in the field. Some faults, however, may remain hidden from developers in the relatively protected environment of the laboratory. Additional faults may be caused by the data which is specific to an individual office and cannot be tested in the laboratory. Such faults may severely affect call processing when a switching office is switched from an old generic program to a new one. Heretofore no effective method has been employed to discover faults in a new generic program under actual field conditions before switching from an old generic program to a new one.

It is an object of the present invention to provide an arrangement in which a first of a pair of duplicated controllers is used to test the operation of the second controller after a new generic program has been stored in the second controller. Operation in this manner provides assurances that the second controller and the new generic program will be able to control the network when the second controller is substituted for the first. By design, the test of the second controller by the first does not negatively impact call processing in the switching network.

SUMMARY OF THE INVENTION

In an arrangement comprising a first and second controller each comprising a first generic program for controlling the operation of the controllers, the method comprising the steps of replacing the first generic program in the second processor with a second generic program, initiating by the first processor the performance of a test sequence by the second processor, testing by the first processor to determine whether the second processor has properly executed the test sequence and generating error signals when the testing step determines that the test sequence was not properly executed.

One embodiment of the present invention includes a control unit which comprises a first and a second controller, each storing a first generic program. After the first generic program is replaced in the second controller with a second generic program, the first controller reads the memory associated with the second controller at a known critical information storage location to determine the storage locations of certain buffers. The first controller then starts a timer and initiates the performance of a generic update initialization by the second controller. When the timer expires at the end of the predetermined period of time, the first controller tests to determine if the generic update initialization is completed. If the initialization is not completed, the first controller stops the second controller, reads test results from the above-identified buffers of the second controller and forwards those test results and a failure message to a central control. When the initialization is completed within the predetermined period of time, the first controller reads test results generated by the initialization in the second controller and compares those test results with expected test results. If the expected test results do not match the actual test results, the test results and a failure message are returned to the central control. In situations where the generic update initialization is completed within the predetermined period of time and the test results match the expected test results, a success message is returned to central control. The success message may be accompanied by the test results as well.

BRIEF DESCRIPTION OF THE DRAWING

A more complete understanding of the present invention may be obtained from a consideration of the following description when read in conjunction with the drawing in which:

FIG. 5 is a flow diagram of the procedures performed by a standby controller during generic program update.

DETAILED DESCRIPTION

Figure 1:
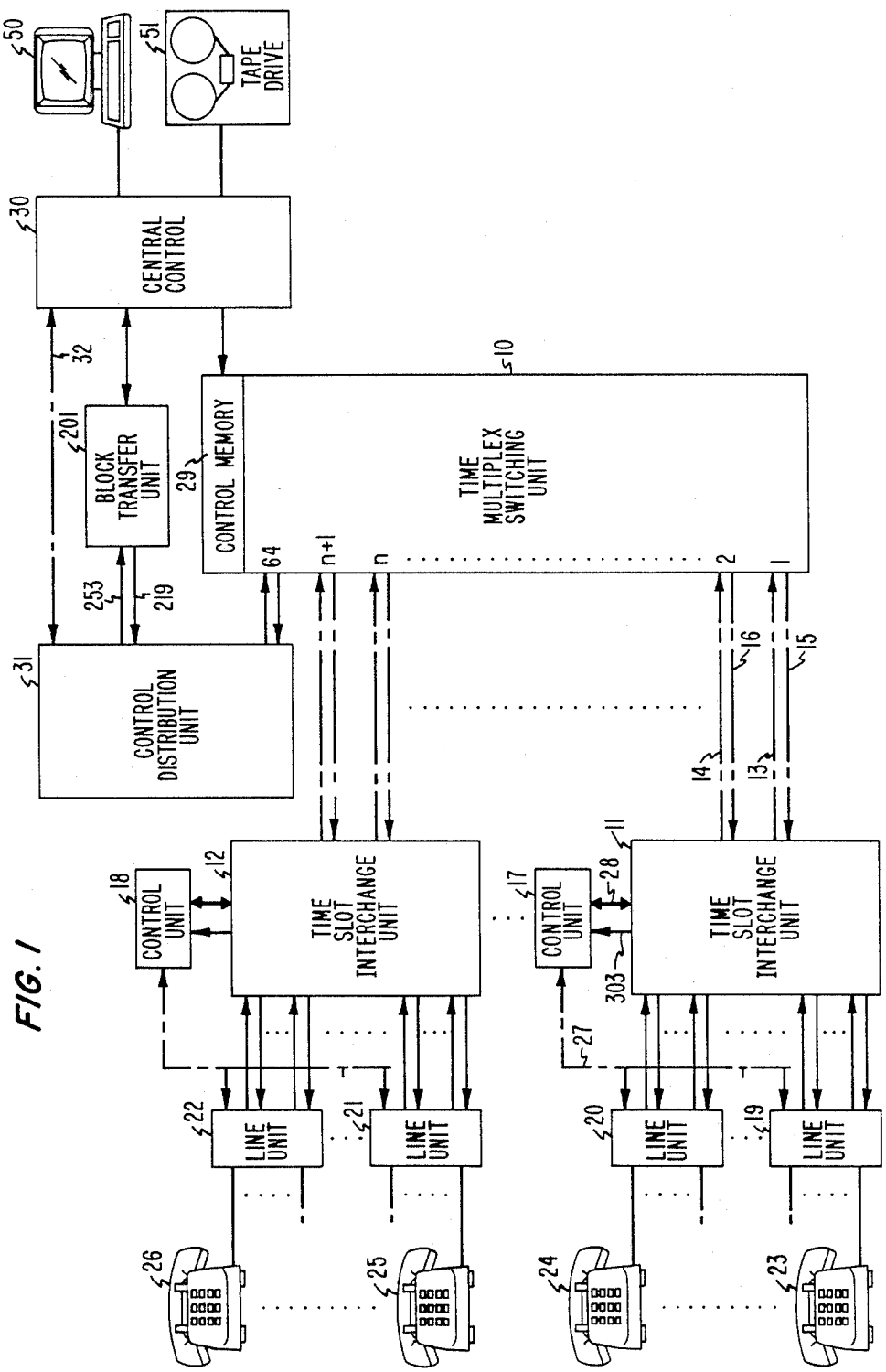
FIG. 1 is a block diagram of the time division switching system employing the present invention.

FIG. 1 is a block diagram of a time division switching system embodying the present invention which is used to interconnect subscriber sets such as subscriber sets 23 through 26. The embodiment of FIG. 1 includes a time multiplex switching unit 10 which comprises a time-shared space division switch having 64 input ports and 64 output ports. The embodiment further includes 31 time-slot interchange units of which representative time-slot interchange units 11 and 12 are specifically shown. Each time-slot interchange unit 11 and 12 includes a bidirectional time-slot interchanger. Additionally, each time-slot interchange unit 11 and 12 is connected to two input ports and two output ports of time multiplex switch unit 10. In the present embodiment, time-slot interchange unit 11 is connected to two time multiplex switch input ports via time multiplex lines 13 and 14 and to two output ports, via time multiplex lines 15 and 16. Each time multiplex line 13 through 16 conveys digital information in 125 microsecond frames each comprising 256 time separated channels. Accordingly, each time-slot interchange unit transmits and receives up to 512 channels of digital information during each 125 microsecond frame.

Each time-slot interchange unit is uniquely associated with a control unit of which control unit 17 is associated with time-slot interchange unit 11, and control unit 18 is associated with time-slot interchange unit 12. Additionally, each time-slot interchange unit is connected to a plurality of line units of which line units 19 through 22 are shown in FIG. 1 via individual time multiplex lines. In the present embodiment line units 19 and 20 are connected to time-slot interchange unit 11 and line units 21 and 22 are connected to time-slot interchange unit 12. Each of the line units of the present embodiment is connected to a number of subscriber sets of which subscriber sets 23 through 26 are shown. The exact number of line units associated with each time-slot interchange unit and the exact number of subscriber sets associated with each line unit is determined by the number of subscribers to be served and the calling rates of those subscribers. Each line unit terminates the analog loop of the well-known type from a plurality of subscriber sets, e.g., 23 through 26, and converts call information including analog speech signals into digital data words which are transmitted to its associated time-slot interchange unit. Further, each line unit detects service requests from the subscriber sets and generates certain signaling information for those subscriber sets. The particular subscriber sets from which speech samples are taken and encoded, and the particular time multiplex channels used to transmit the resulting code between the line unit and its associated time-slot interchange unit are determined by the control unit of the associated time-slot interchange unit.

Time multiplex switching unit 10 operates in recurring frames of time slots where each 125 microsecond frame comprises 256 time slots. During each time slot, time multiplex switching unit 10 is capable of connecting data words received at any of its 64 input ports to any of its 64 output ports in accordance with time-slot control information stored in a control memory 29. The pattern of connections through time multiplex switching unit 10 repeats itself every 256 time slots and each time slot is assigned a numerical designation in sequence from 1 to 256. Time-slot control information is written into control memory 29 by the central control 30 which derives this control information from control messages obtained from various control units, e.g., 17 and 18. Additionally, central control 30 is the entry point for external control. Central control 30 is connected to an input/output terminal 50 which is used by maintenance personnel to enter data and to receive system status messages. Further, central control 30 is connected to a magnetic tape unit 51 which is used to store backup data and to enter new programs and data into the switching system.

Central control 30 and the control units 17 and 18 exchange control messages utilizing selected channels called control channels of the time multiplex lines, e.g., 13 through 16, between the time-slot interchange units and the time multiplex switching unit 10. Time-multiplex switch 10 connects the information in the control channels to a control distribution unit 31 which interprets a destination defining portion of the message. When the destination portion defines the central control 30 as the destination for the associated message, that message is transmitted to central control 30 via a conductor 32. When the destination portion defines a control unit, e.g., 18, the control distribution unit 31 cooperates with the time-multiplex switch 10 to transmit the message to the input circuitry (not shown) of the time slot interchange unit associated with destination control unit in the control channels associated with the defined destination. The input circuitry receives the control information in the control channels and forwards that information to the destination control unit. In addition to the above, central control 30 can transmit control messages to the control units, e.g., 17, 18, by transmitting to control distribution unit 31, a control message which has an address portion defining the destination control unit.

The present embodiment also includes arrangements for sending control information from central control 30 to the control units 17 and 18 at data rates higher than the rate available using the control channels. When large amounts of data are to be transmitted, the data is sent to a block transfer unit 201, which cooperates with the control distribution unit 31 and time-multiplex switch 10 to select up to 32 normally speech-conveying channels on time-multiplex lines 13 through 16 between time-multiplex switch 10 and the destination time-slot interchange unit, e.g., 11, for the transmission of control information. The data in these selected channels is gated by the time-slot interchange unit 11 to control unit 17 via a communication path 303. Methods and arrangements for providing digital time division switching and for the distribution of control information are well known in the art and can be found, for example, in W. K. Wen U.S. Pat. No. 4,520,477.

Figure 2:
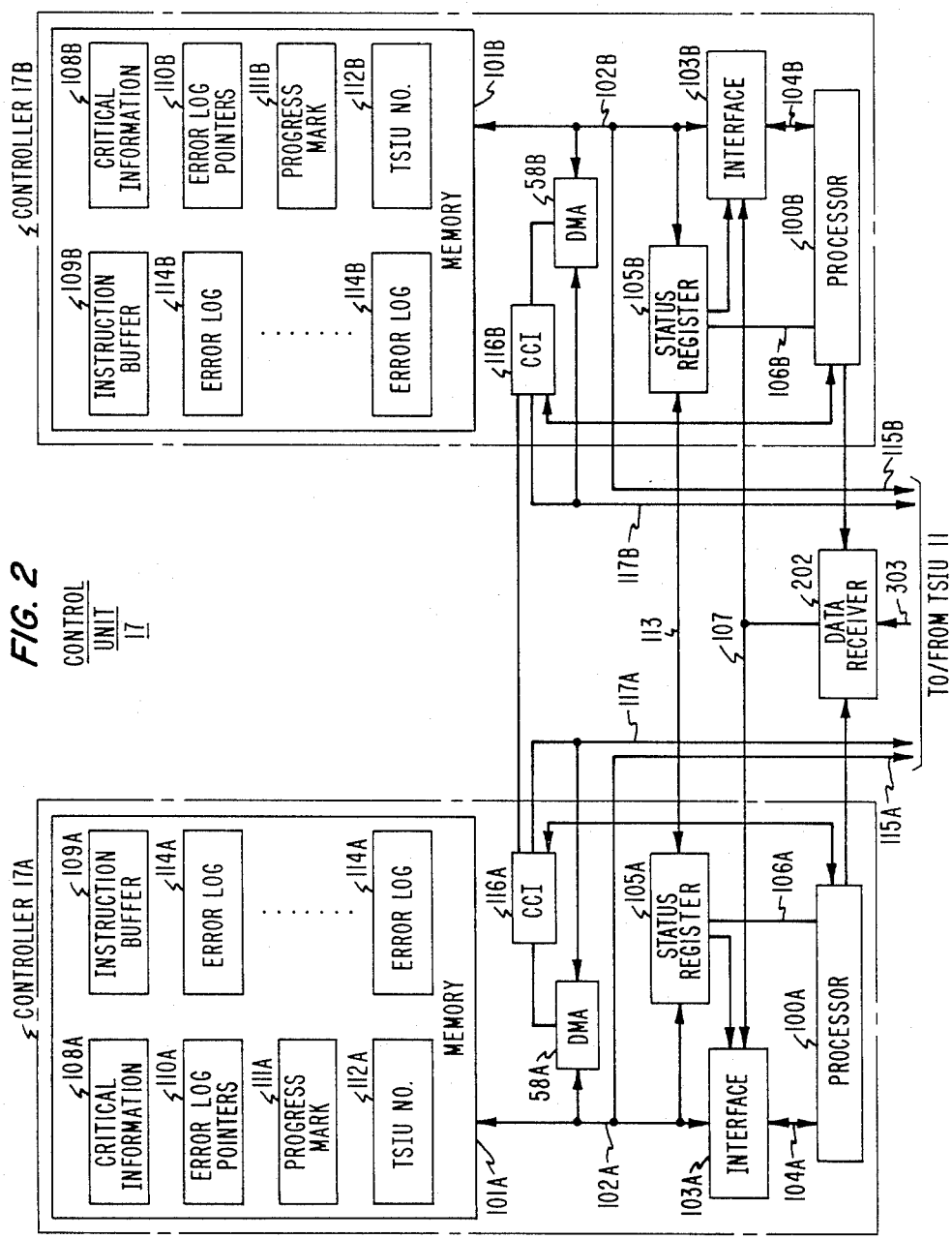
FIG. 2 is a more detailed drawing of the duplicated nature of the control units used in FIG. 1.

Many of the components of the present embodiment are duplicated for purposes of reliability. For example, each time-slot interchange unit, e.g., 11, is actually two identical time-slot interchange units. Further, each control unit, e.g., 17, actually comprises two controllers; one being uniquely associated with each time-slot interchange unit of the duplicated pair. FIG. 2 is a block diagram showing the duplicated nature of control unit 17. It should be mentioned that the other control units, e.g., 18, of the switching system are substantially identical to FIG. 2. The control unit 17 is shown as duplicated controllers 17A and 17B in FIG. 2. The designations of the internal components of controller 17A all include a suffix A while the designation of the equivalent components of controller 17B have the same component number and a suffix B. Controllers 17A and 17B normally operate in the active/standby mode where a first controller, e.g., 17A, is actively controlling portions of the switching network while the other controller, e.g., 17B, is being kept up to date so that it can replace the first when the need arises.

Controller 17A comprises a processor 100A which operates under the control of instructions and data stored in a memory 101A to control switching system functions. Processor 100A may, for example, be the Motorola 68000 microprocessor. Instructions are retrieved by controller 100A from memory 101A via bus 102A and interface unit 103A and a bus 104A. Interface unit 103A is, in essence, a gating arrangement which provides read and write access to various storage devices in controller 17A and controller 17B as will be discussed in greater detail later herein. Controller 17A also includes a plurality of status registers 105A.

Certain of the bit positions of status registers 105A are directly connected as inputs to the interface unit 103A and are used to control the function of interface unit 103A. Status registers 105A share the address spectrum on bus 102A and can be read from or written into by read/write orders on bus 102A. Processor 100A controls the interface unit 103A by writing particular patterns into status registers 105A. Processor 100A is also connected to the status registers 105A by a communication path 106A. Processor 100A uses path 106A to change the status registers 105A when those registers are defining connections through interface unit 103A which deny access to bus 102A by processor 100A.

Certain of the bit positions of status registers 105A are cross coupled to the status registers 105B via a communication path 113. A write order to these certain bit positions in one set of status registers results in a change of the contents of the other set of status registers. Use of the cross coupling provided by communication path 113 is discussed later herein. Controller 17A also includes a direct memory access (DMA) unit 58A which is connected to bus 102A. DMA unit 58A is also connected by a bus 117A to the input circuitry (not shown) in time-slot interchange unit 11 so that control information can be sent and received in the control channels of time multiplex lines 13 through 16. A central control intervention arrangement (CCI) 116A is also provided in controller 17A. This unit cooperates with the DMA unit 58A to receive certain bit positions from the control channel information on bus 117A. The information received by central control intervention unit 116A (called an intervention message herein) defines certain functions which are used to affect the operation of processor 100A. For example, central control intervention unit 116A in response to appropriate intervention messages on bus 117A can force control unit 17A into many of its possible states. This arrangement is described in detail in Beuscher et al. U.S. Pat. No. 4,484,323. Additionally, bus 102A is connected to time-slot interchange unit 11 via a bus 115A. Bus 115A is used to update call controlling information stored in the control memories of time-slot interchange unit 11.

Figure 3:
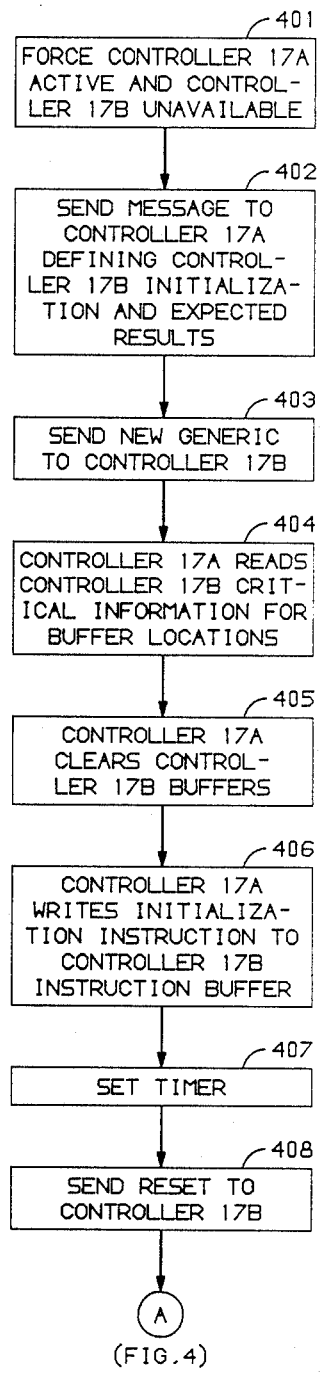
FIGS. 3 and 4 comprise a flow diagram of the functions performed at the time of a generic program update.

The following is a discussion of the operation of the switching system of FIGS. 1 and 2 when generic program update occurs. For the present example, the program update consists of a complete change of generic program in control unit 17. Initially, the new generic program is stored in the disc memory (not shown) of central control 30 (FIG. 1) via tape drive unit 51. The generic update sequence performed by controllers 17A and 17B is shown in flow diagram form in FIGS. 3, 4, and 5. The update sequence begins when central control 30 responds to a command entered at the input/output terminal 50 by maintenance personnel. First, central control 30 transmits an intervention message to central control intervention unit 116A as previously discussed which message defines that controller 17A is to be forced active, and that controller 17B is to be forced unavailable. Central control intervention unit 116A communicates this information to processor 100A which responds thereto by writing into its status registers 105A, information defining the forced active state. This information is cross coupled to status registers 105B. This newly cross coupled information in status registers 105B defines the forced unavailable state. Accordingly, processor 100B responds to the information in its associated status registers 105B by assuming the forced unavailable state. This is shown in action block 401 of FIG. 3. In this mode, both controllers are capable of executing instructions. Controller 17A is in control of the network and no switch between active/not active controllers can occur until the "forced" states are cleared.

Next, a control message is transmitted (action block 402) by central control 30 to controller 17A using the above-described control channels. This message defines that the generic program is being updated, that a generic update initialization is to be performed by controller 17B, and certain expected results. In the present embodiment, the generic update initialization is a test sequence used to test the operability of a controller executing the new generic. The expected results are results which should be achieved by controller 17B during the performance of a generic update initialization. Such expected results include a progress mark, which can be used to determine successful completion of the generic update initialization.

After the generic initialization control message is transmitted, the new generic program is transmitted (action block 403) from central control 30 to time-slot interchange unit 11 using the bulk transfer arrangement described in the above noted Wen U.S. Pat. No. 4,520,477. The new generic program is transmitted by time-slot interchange unit 11 to data receiver 202 (FIG. 2) via a conduction path 303. The new generic program is then transmitted from data receiver 202 to memory 101B to be stored thereby via a bus 107, interface unit 103B, and a bus 102B.

The generic program of the present embodiment includes substantially all of the items necessary for the reliable control of a portion of the switching system. It includes the programs necessary for the control of call processing, as well as data describing office equipage for use by the call processing programs. Maintenance and recovery programs are also included in the generic program. Further, initialization programs are included in the generic program. These initialization programs are used when the generic program is first loaded into the control unit or in fault recovery actions to bring the switching system and its controllers into a known state so that call processing can continue. The initialization programs, when executed, clear unused and/or unusable memory areas, establish and populate data structures, and perform tests to determine the validity of processor operation.

Memories 101A and 101B include a critical information storage area represented in FIG. 2 as 108A and 108B, respectively. The information stored in the critical information storage area 108B is a part of the new generic program and is stored in a predetermined location in memory 101B. In accordance with the present example, critical information is stored in the same location for all generic programs. The critical information stored in memory area 108B includes the addresses of an instruction buffer 109B, an error log pointer 110B, a progress mark buffer 111B, and a time-slot interchange unit number buffer 112B. The use of the information stored in these various memory locations in the program update sequence is discussed below.

After receiving the generic update notice message from central control 30, active processor 100A stores information in status registers 105A to control interface 103A to provide access to memory 101B. Processor 100A then reads (action block 404) the critical information stored in memory 101B via interface 103A, bus 107, interface 103B and bus 102B. The information so read defines the memory locations of buffers 109B through 112B discussed above. Processor 100A then clears (action block 405) the instruction buffer 109B, the progress mark buffer 111B, and time-slot interchange unit number buffer 112B based on the critical information read from the critical information buffer 108B. After the buffers are cleared, processor 100A writes (action block 406) an instruction defining a generic update initialization into instruction buffer 109B. Next, processor 100A starts an internal timer which is used to measure the ability of controller 17B to successfully execute the generic update initialization (action block 407). The timer is used to notify processor 100A a predetermined period of time, e.g., ten minutes, after being started, to check on the completion of the generic update initialization by processor 100B. When the timer is started, a reset signal is transmitted (action block 408) to processor 100B. The reset signal is transmitted to processor 100B by writing information into status registers 105A which information is cross coupled to the status registers 105B via communication path 113. Processor 100B responds to the information cross coupled to the status registers 105B by beginning a reset sequence. Meanwhile, processor 100A continues call processing operations awaiting the expiration of the predetermined amount of time (action block 409, FIG. 4).

FIG. 5 is a flow diagram of the operations undertaken by controller 17B in response to the reset signal. It will be remembered that processor 100A placed information defining a generic update initialization in instruction buffer 109B. In response to the reset signal, processor 100B reads the contents of the instruction buffer, determines that it is a request for a generic update initialization, and begins executing (action block 410) the generic update initialization sequence of instructions which is a part of the new generic program. First, processor 100B stores the addresses of one or more error logs 114B in error log address buffer 110B (action block 411). Errors, both minor and major, may be encountered while performing the generic update initialization instruction sequence. The error logs 114B are used by the generic update initialization program to record information regarding such errors which information may be helpful in analyzing the successfulness of the initialization. Next, controller 17B clears unused memory locations, populates data bases needed for call processing, and generally places controller 17B in a state from which call processing can be controlled (action block 412). Additionally, processor 100B places a time-slot interchange number which is a part of the new generic in the time-slot interchange unit number buffer 112B (action block 413). The time-slot interchange unit number is a part of all generic programs (both old and new) and comprises a code which uniquely identifies the time-slot interchange unit expected to be associated with the generic program containing the code. If for some reason a new generic program becomes associated with the wrong time-slot interchange unit, the time-slot interchange unit number can be used to identify the problem.

The generic update initialization is controlled by a number of instructions which are performed in sequence. Some of these instructions are progress mark update instructions which when executed cause the contents of the progress mark buffer 111B to be incremented (action block 414). Thus, the contents of progress mark buffer 111B indicate the extent to which the generic update initialization has been completed. At the end of the generic update initialization, processor 100B writes information into status registers 105B defining the halt or sleep state for processor 100B. Processor 100B responds to the new information in status register 105B by assuming the halt state, in which processor 100B merely waits for a change of status. The information defining the halt state is cross coupled to status registers 105A via communication path 113.

Figure 4:
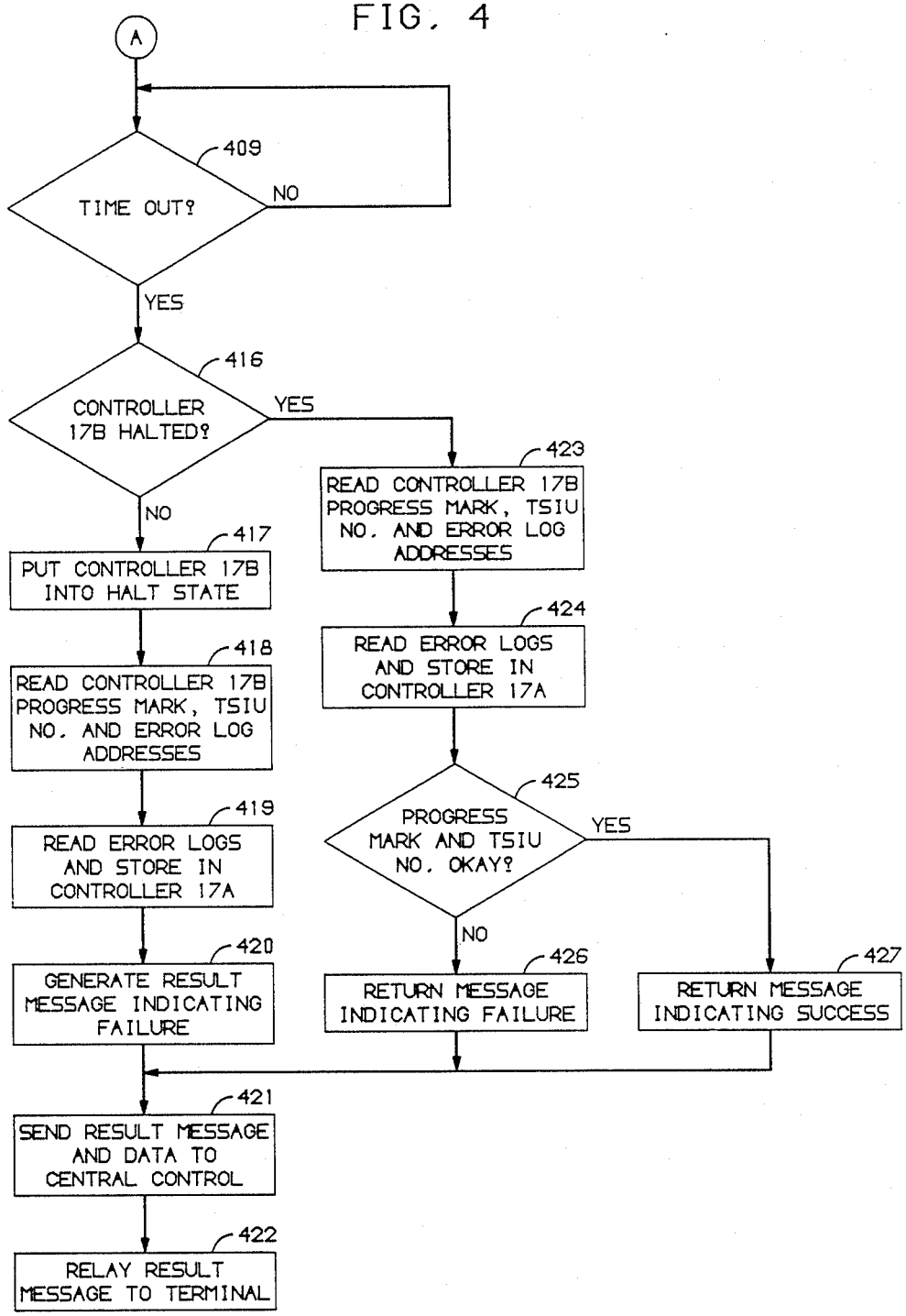

When the timer set by processor 100A reaches its predetermined value, processor 100A reads its status registers 105A to determine whether controller 17B is in the halt state (action block 416, FIG. 4). When controller 17B is not in the halt state, the generic update initialization has not been completed within the predetermined amount of time. Processor 100A then puts processor 100B into the halt state (action block 417) by writing information into status registers 105A which information is cross coupled to the status registers 105B. Processor 100A continues (action block 418) by reading the progress mark stored in progress mark buffer 111B, the time-slot interchange unit number stored in time-slot interchange unit buffer 112B and the error log addresses stored in the error log address buffer 110B and stores this information in memory 101A. It will be remembered that the addresses of these buffers was previously obtained by reading the critical information area 108B of memory 101B. Based on the error log addresses, processor 100A also reads the error logs 114B and stores this information in memory 101A (action block 419). Since the generic update initialization did not complete within the predetermined period of time, a result message indicating failure is generated by processor 100A (action block 420). This result message, the progress mark read from buffer 111B, the time-slot interchange unit number read from buffer 112B, and the information from the error logs 114B is transmitted to central control 30 via the above described control channels (action block 421). Central control 30 stores this information and in response to the result message of failure, notifies the maintenance personnel of the failure by a message sent to input/output terminal 50 (action block 422). Maintenance personnel will respond to the failure message by analyzing the data accumulated in central control 30 to determine the source of the failure and to formulate corrective actions.

The above is a discussion of the actions performed when processor 100B was found not to be in the halt state at the end of the predetermined period of time. The following discusses the operations performed when processor 100B is found to be in the halt state. Initially, progress mark, the time-slot interchange unit number, and the error log addresses are read from the buffers 111B, 112B and 110B, respectively (action block 423). Then the error logs 114B are read and stored in memory 101A (action block 424). Next, the progress mark and time-slot interchange unit numbers are compared with the results expected in processor 100A (action block 425). It will be remembered that the expected progress mark was transmitted to controller 17A in action block 402 (FIG. 3) and that the old generic program in controller 17A includes the time-slot interchange unit number of its associated time-slot interchange unit. When the actual results do not match the expected results, a result message indicating failure is generated (action block 426) and transmitted to central control 30 along with the progress mark, the time-slot interchange unit number, and the error logs read from memory 101B (action block 421). Maintenance personnel are then notified of the failure as above discussed.

Alternatively, when the performance of action block 425 indicates that the progress mark and the time-slot interchange unit number are correct, a return message indicating success is generated (action block 427) and transmitted to central control 30 (action block 421). The success message is also forwarded to input/output terminal 50 to notify the maintenance personnel. Even when a successful generic update initialization is indicated, it may be desirable to provide the maintenance personnel with the progress mark, the time-slot interchange unit number, and the error logs from the controller, e.g., 17B, receiving the new generic program. Accordingly, in accordance with the present example, this information is transmitted to central control 30 even when a results message indicating success is generated.

When a return message indicating successful completion of the generic update initialization is received, maintenance personnel transmit a control message via input/output terminal 50 to controllers 17A and 17B. This control message defines that the forced active and forced unavailable states are to be removed and that controller 17B is to become the active controller and thus be in control of the switching network. After an appropriate interval of time to increase confidence that the new generic is performing as expected, the new generic is transmitted from memory 101B to memory 101A in controller 17A via the communication path 107. Upon completion of the transfer of the new generic program, controllers 17A and 17B continue in the active/standby mode with controller 17B being in control of the network. Operation as above described allows call processing to continue under the control of the active controller during the generic update procedure. Further, the assurances of successful operation provided by the present invention limit the possibility of service impacting problems when the active/standby roles are changed.

It is to be understood that the above-described embodiment is merely illustrative of the principles of the invention and that other arrangements may be devised by those skilled in the art without departing from the spirit and scope of the invention. For example, in the preceding embodiment, critical information is stored in the same memory location in all generics. This need not be the case. Critical information could be stored anywhere in memory 101B by the new generic provided that controller 17A is made aware of where the critical information is located before it is used.

What is claimed is:

1. In an arrangement comprising a first and a second processor each having an active and a standby state, wherein a processor in the active state controls operations of said arrangement, each processor comprising a first generic program for defining operation of the processors in controlling said arrangement, a method of replacing said first generic program comprising the steps of:
   placing said first processor in the active state and placing said second processor in the standby state;
   replacing the first generic program in said second processor with a second generic program, said second generic program being different from said first generic program;
   initiating by said first processor performance of a test sequence by said second processor, said test sequence being designed to test the accuracy of operation of said second processor under the control of said second generic program;
   testing by said first processor to determine whether said second processor has properly executed the test sequence; and
   generating error signals when said testing step determines that said second processor has not properly executed said test sequence;
   whereby said second generic program is tested in the environment of said arrangement without interruption of operations of said arrangement.

2. The method in accordance with claim 1 wherein the performance of said test sequence by said second processor comprises the step of generating test results and storing said test results at a first predetermined location in said second processor and wherein said testing step comprises;
   reading by said first processor the test results stored at said first predetermined location in said second processor.

3. The method in accordance with claim 2 further comprising the step of notifying said first processor of said first predetermined location.

4. The method in accordance with claim 3 wherein said notifying step comprises the steps of:
   reading by said first processor the contents of a critical information area stored in a known location in said second processor to identify said first predetermined location; and
   reading by said first processor the test results stored at said first predetermined location in said second processor.

5. The method in accordance with claim 2 further comprising the step of transmitting by said first processor, said test results to a third processor.

6. The method in accordance with claim 1 wherein said testing step comprises testing by said first processor to determine whether the performance of said test sequence by said second processor is completed within a predetermined period of time.

7. The method in accordance with claim 1 wherein said initiating step comprises:
   writing by said first processor a generic update initialization instruction at a second predetermined location in said second processor; and
   stimulating said second processor to execute said generic update initialization.

8. The method in accordance with claim 7 wherein the writing step comprises:
   reading by said first processor the contents in a critical information area stored in a known location in said second processor to identify said second predetermined location; and
   writing by said first processor a generic update initialization instruction at second predetermined location in said second processor.

9. The method in accordance with claim 1 wherein the performance of said test sequence by said second processor comprises the step of generating test results and storing said test results at a first
comparing said test results with expected valid test results.

10. The method in accordance with claim 1 wherein the performance of said test sequence by said second processor comprises the step of generating test results and storing said test results in a first predetermined location in said second processor and wherein said testing step comprises:
testing by said first processor to determine whether the performance of said test sequence by said second processor is completed within a predetermined period of time; and
when the performance of said test sequence by said second processor is completed within said predetermined period of time said testing step further comprises:
reading by said first processor the test results stored at said first predetermined location in said second processor; and
comparing said test results with expected valid test results in said first processor.

11. In a telecommunication switching system comprising a switching network and a first and a second control unit, said first control unit comprising a memory for storing a first generic program for directing the control of said switching network by said first control unit and said second control unit comprising a memory for storing a second generic program for directing control of said switching network by said second control unit, said second generic program being different from said first generic program, a method comprising:
forcing said first control unit to control said network to the exclusion of said second control unit;
initiating by said first control unit performance of a test sequence by said second control unit said test sequence being designed to test the accuracy of operation of said second control unit under the control of said second generic program;
testing by said first control unit to determine whether said second control unit has properly executed the test sequence; and
generating error signals when said testing step determines that said second control unit has not properly executed said test sequence.

12. The method in accordance with claim 11 further comprising the step of forcing said second control unit to control said network to the exclusion of said first control unit when said testing step determines that said control unit has properly executed said test sequence.

13. The method in accordance with claim 11 wherein the performance of said test sequence by said second control unit comprises a step of generating test results and storing said test results in a first predetermined location in said second control unit and wherein said testing step further comprises:
testing by said first control unit to determine whether the performance of said test sequence by said second control unit is completed within a predetermined period of time; and
when the performance of said test sequence by said second control unit is completed within said predetermined period of time, said testing step further comprises:
reading by said first control unit the test results stored at said first predetermined location in said second control unit; and
comparing the test results with expected valid test results in said first control unit.

14. The method in accordance with claim 13 further comprising the step of forcing said second control unit to control said network to the exclusion of said first control unit when said comparing step determines that said expected valid test results are identical to said test results.

15. The method in accordance with claim 13 further comprising the step of:
reading by said first control unit the contents in a critical information area stored in a known location in said second control unit to identify said first predetermined location in said second processor.

* * * * *

UNITED STATES PATENT AND TRADEMARK OFFICE
CERTIFICATE OF CORRECTION

PATENT NO. : 4,755,995

DATED : July 5, 1988

INVENTOR(S) : Roy E. Anderson, et al

It is certified that error appears in the above-identified patent and that said Letters Patent is hereby corrected as shown below:

Col. 11, claim 9, before line 5, should be --predetermined
location in said second processor and wherein said testing
step comprises:
reading by said first processor the test results stored at said
first predetermined location in said second processor; and--

Col. 12, line 10, after "that said" insert --second--.

Signed and Sealed this

Third Day of December, 1991

Attest:

HARRY F. MANBECK, JR.

*Attesting Officer*       *Commissioner of Patents and Trademarks*